United States Patent Office 2,696,425
Patented Dec. 7, 1954

2,696,425

PROCESS FOR EXTRACTING ZIRCONIA FROM ZIRCON ORES

Samuel S. Kistler, West Boylston, Mass., assignor to Norton Company, Worcester, Mass., a corporation of Massachusetts No Drawing. Application January 5, 1952, Serial No. 265,191

16 Claims. (Cl. 23—140)

The invention relates to the production of substantially pure zirconia and of alkali silicate from zircon ores.

One object of the invention is to provide a process for the extraction of zirconia from zircon ores which on a net cost basis is relatively cheap. Another object is to provide a process yielding zirconia high in purity. Another object is to provide a process yielding zirconia in particle sizes especially desired for use in many commercial applications. Another object is to provide a process which utilizes the silica contained in the zircon to form alkali silicate of good grade and saleability as a by-product. Another object is to provide a process which is economical of chemical agents. Another object is to provide a process of the nature indicated which involves the use of relatively low temperatures thus keeping the overall expense low. Another object is to provide a process such that, by using more or less of a particular reactant, or not using it at all, the size of the particles can be controlled.

Another object of the invention is to provide zirconia especially useful for pigments. Another object is to provide zirconia especially useful for polishing. Another object is to provide zirconia for use in making refractory articles. Another object is to provide zirconia for the manufacture of refractory cements. Another object is to provide zirconia in comminuted form for use as a refractory thermal and/or electrical insulating material. Another object is to provide zirconia from which electrical resistors can be manufactured.

Other objects will be in part obvious or in part pointed out hereinafter.

Zircon ore of composition having little other than the elements zirconium, hafnium, silicon and oxygen is readily available, the sources including alluvial sands in Australia, Ceylon and other places. The element hafnium is so indistinguishable from zirconium in its physical properties and chemical behavior that for most applications no practical purpose is served by separating the two elements or their compounds. The process of the invention is equally useful for the separation of hafnia from hafnium silicate as of zirconia from zircon. Since all commercial sources of zirconia contain ca. 3% hafnia, it will be understood in this patent that when zirconia is referred to, such hafnia is included.

For the production of pure hafnia or hafnium compounds in processes of which I am aware, the preliminary concentration of hafnia together with zirconia is necessary and for this purpose the process of my invention is eminently suitable.

Typical ores which can be processed according to the present invention with commercially profitable results include those within the limits set forth in the following table.

Table I

| | Per cent |
|---|---|
| ZrO₂ including any HfO₂ | 50 to 95 |
| SiO₂ | 5 to 50 |

I have discovered a new process for the production of high purity zirconia of controlled particle size from inexpensive zircon involving the thermal decomposition of zircon to zirconia and silica glass and removal of the silica glass.

Numerous methods for the recovery of zirconium oxide from zircon and other zirconium bearing ores have appeared in the literature. The most eminently satisfactory process involves fusion in an electric furnace (U. S. Patent 2,535,526, December 26, 1950). For certain applications, however, this process is not entirely satisfactory because it produces massive zirconium oxide that must be ground to produce the fine particle size required for use as an opacifier in ceramics, as a glass polishing agent, etc. Grinding not only is expensive but introduces impurities which are difficult to remove.

Numerous methods for the separation of zirconia from zircon by fusing with some reagent and subsequent leaching appear in the literature. J. W. Marden and M. N. Rich of the U. S. Bureau of Mines in an article in Industrial and Engineering Chemistry, volume 12, page 651, have summarized the more promising fusion methods and recommend particularly a mixture of one part of zirkite, which is an ore containing both zirconium oxide and zirconium silicate, plus three parts of sodium carbonate and three parts of sodium hydroxide. After fusion for one hour, the mass is leached in hot water, the residue dissolved in HCl, neutralized, and the ZrO₂ precipiated with SO₂. While this process is successful from a chemical point of view, it is very expensive and there are no useful by-products to help bear the cost. The other fusion methods reported by Marden and Rich are equally impractical.

In my process the first step, the decomposition of zircon to zirconia and silica glass, is effected by heat. It was known that when zircon is heated to a temperature of approximately 1800° C., it is completely decomposed into minute crystals of zirconia and fused silica. However, as was also known, if this operation is done in a furnace and the temperature is allowed to drop slowly, the zirconia and silica will partially recombine again to form zircon (zirconium silicate).

I now have discovered that the thermal decomposition of zircon into zirconia and silica can be carried out at much lower and more cheaply attainable temperatures, and reversal of the reaction can be reduced or prevented if the zircon ore is heated in the presence of small additions of compounds capable of reacting with $SiO_2$. In general, a compound that will react with silica to produce a glass is effective in reducing the temperature of decomposition. On the other hand, compounds that form a crystalline compound with silica are in general ineffective unless used in relatively large quantities. I have found that the alkali bases are most satisfactory and can use sodium or potassium hydroxide, carbonate, sulphate, or other compounds that will furnish $Na_2O$ or $K_2O$ to dissolve in the silica glass. In fact I can use any comminuted glass forming compound yielding alkali oxide selected from the group consisting of $Na_2O$ and $K_2O$. Lithium compounds are not effective because they form a lithium-zirconium silicate and do not enter substantially into the silica glass. Potassium compounds are somewhat more effective than sodium compounds in decomposing zircon but they show two defects that make sodium compounds the most desirable addition products. They are more expensive than equivalent sodium compounds and at concentrations of $K_2O$ high enough to effect the decomposition of zircon at cone 16 (ca. 1435° C.) sometimes a potassium-zirconium silicate crystalline phase separates out reducing the effectiveness of the process. Apparently the solubility of this compound in the glass is relatively low but one frequently obtains sufficient supersaturation completely to decompose the zircon. There is no danger of the separation of a crystalline phase of sodium-zirconium silicate when $Na_2O$ is used because even at the low temperature conditions of cone 16 the amount of $Na_2O$ sufficient to effect complete decomposition will not cause any sodium-zirconium silicate phase to separate out. The influence of $Na_2O$ on the decomposition temperature is illustrated by Tables II and III.

Mixtures of zircon and sodium carbonate were heated to 1650° C. for 10 minutes. In Table II column 1 gives the moles of $Na_2CO_3$ per mole of zircon; column 2 gives the percentage of decomposition of the zircon; column 3 gives the percentage of decomposition upon reheating to 1770° C.

Table II

| $Na_2CO_3$, Moles | Decomposition of Zircon | |
|---|---|---|
| | 1,650° C., 10 Min. | 1,770° C. |
| | Percent | Percent |
| .04 | 70 | 100 |
| .08 | 90 | 100 |
| .15 | 100 | 100 |
| .30 | 100 | |
| .50 | 100 | |

I have found that by the addition of $Na_2O$, or equivalent, I can get complete decomposition of the zircon at cone 16, which involves convenient and economical firing temperatures.

The following table illustrates the influence of the proportion of $Na_2O$ upon the completeness of decomposition at three different temperatures.

Table III

| Moles $Na_2O$ per Mole Zircon | Temperature, °C. | Time, hours | Percent Decomposition |
|---|---|---|---|
| 0.1 | 1,550 | ½ | 100 |
| 0.1 | 1,500 | ½ | 95 |
| 0.1 | 1,400–1,435 | 20 | 10 |
| 0.15 | 1,550 | ½ | 100 |
| 0.15 | 1,500 | ½ | 100 |
| 0.15 | 1,400–1,435 | 20 | 20 |
| 0.20 | 1,400–1,435 | 20 | 100 |

The particle size of the zirconium oxide produced is influenced greatly by the temperature to which the zircon has been heated. For example, if the zircon is heated briefly to 1800° C., the average crystal diameter is in the neighborhood of 1 micron with many crystals substantially smaller. By heating to 2000° C., the average crystal diameter is approximately 2 microns while if the zircon is completely fused at a temperature somewhat above 2400° C., the crystals of zirconia range between 25 and 50 microns in diameter. It is therefore possible, by controlling the temperature and time of firing, to control the particle size of the zirconia. This is very important for some applications, especially for pigments and as a polishing agent. The reflectivity of a pigment is very importantly influenced by the particle size and, therefore, for maximum covering power, it is necessary to control particle size within fairly narrow limits. The efficiency of a glass polishing agent is greatly affected by particle size and the same applies to most applications in the fields of ceramics and refractories. It is therefore desirable to effect close control over particle size in order to produce an optimum product.

The particle size of the zirconia obtained varies with varying percentages of soda or sodium carbonate or other agent used, the resultant particles being larger when more of the agent is used. In Table IV I illustrate the foregoing and note that the results are predictable and uniform to the extent indicated. In this table "$Na_2CO_3$ Moles" means the number of moles of sodium carbonate to one mole of zircon and hafnium silicate.

Table IV

| $Na_2CO_3$ Moles | Particle Size (Microns) | | |
|---|---|---|---|
| | 1,400–1,435° C., 20 Hours | 1,650° C., 10 Min. | 1,770° C. |
| .04 | | 1 | 1–3 |
| .08 | | 2 | 1–5 |
| .15 | | 1–5 | 1–10 |
| .20 | 2–6 | | |
| .30 | | 1–10 | |
| .50 | | 1–10 | |

The last item contained a small amount of crystalline sodium zirconium silicate.

The addition of other glass formers with the alkali metal oxide is beneficial in decomposing the zircon and may have a substantial influence on the crystal size. For example, borax, when substituted for sodium carbonate, effects complete decomposition at a somewhat lower concentration and accelerates grain growth so that at a given temperature, the addition of varying amounts of borax in place of the sodium carbonate is a means of controlling the crystal size.

The refractive index of the glass phase in the series in Table II above was studied and indicated that with increase in $Na_2O$, there is an increase in the percentage of zirconia dissolved in the glass. This is shown in Table V below where in the fourth column, the difference between the calculated and observed refractive index, indicates the influence of dissolved zirconia. As a first approximation, the dissolved zirconia can be assumed to be directly proportional to the difference.

Table V

| Moles $Na_2CO_3$ | Calculated Refractive Index | Observed Refractive Index | Difference |
|---|---|---|---|
| .04 | 1.464 | 1.51 | .05 |
| .08 | 1.469 | 1.52 | .05 |
| .15 | 1.480 | 1.54 | .06 |
| .30 | 1.496 | 1.59 | .09 |
| .50 | 1.506 | 1.59 | .08 |

Small amounts of zirconia dissolved in silica glass have a powerful effect upon the rate of solution of the glass in alkali. For example, samples of the items in Table II were ground to pass a 16X screen and boiled for one hour in one normal sodium hydroxide solution and the loss of weight was determined. Table VI gives the results.

Table VI

Moles $Na_2CO_3$: Per cent loss in weight
- .04 — 17.54
- .08 — 8.75
- .15 — 5.22
- .30 — 1.25
- .50 — 6.32

It will be seen from this table that an increase in $Na_2O$ content of the glass up to 0.3 mole diminishes its solubility in one normal sodium hydroxide solution, and even at 0.5 mole the solubility is very low. The solubility of the glass in pure water is very much less than in a solution of sodium hydroxide but becomes substantial when the glass contains a large amount of $Na_2O$. This fact, then, explains why former workers added so much $Na_2O$ to the zircon prior to fusing it. The resultant product would not dissolve satisfactorily in water when less than about three moles of $Na_2O$ were added per mole of silica present.

Another reason for formerly using so much alkali in the fusion was that it was felt that complete fusion was necessary. When less than 3 moles of $Na_2O$ per mole of zircon was used, the mass only sintered and did not fuse at the temperatures employed.

While, as previously indicated, I can use any of many different comminuted glass forming compounds yielding alkali oxide selected from the group consisting of $Na_2O$ and $K_2O$ (including mixtures of such compounds) such as those previously mentioned and also others such as sodium and potassium sulphides and acetates and borax, the preferred glass forming alkali compound is anhydrous sodium carbonate (soda ash) which is used in the form of a powder of about 100 mesh particle size or finer. Soda ash is cheap and is readily available. The ore should be ground finely, preferably to 100 mesh particle size or finer.

The mixture is heated in any suitable kiln or furnace capable of firing ware under at least cone 15 conditions. Heat treatment in the ceramic art is usually a function of both time and temperature and not of temperature alone. The only accepted way of defining such heat treatment is by the use of cone numbers and, in the present case, the mixture of zircon ore and alkali is given a heat treatment to at least cone 15 conditions, meaning to include heat treatment to conditions defined by any cone whose number is higher than 15 and including also conditions defined by cone 15 but, so far as certain aspects of the invention are concerned, avoiding fusing the mixture. I have found that either an oxidizing or reducing atmosphere is satisfactory although the latter effects complete decomposition of the zircon at somewhat lower temperatures.

As an example, I find that cone 16 kilns can be used to give the heat treatment to the mixture of zircon ore and alkali and cone 16 kilns are widely available and are not expensive to operate; thus this step in the process can be carried out with readily available equipment and is not expensive. At the present time the hottest kilns which are commercially available heat ware to cone 35 conditions; a very efficient cone 35 kiln is described in my U. S. Patent No. 2,571,897 granted October 16, 1951. As a guide to the temperatures involved, a kiln operating on a short firing cycle to give heat treatment under cone 15 conditions will reach a top temperature of about 1410° C.; a kiln operating on a short firing cycle to give heat treatment under cone 35 conditions will reach a top temperature of about 1785° C., but on longer firing cycles these top temperatures may be 1390° C. and 1750° C. respectively. In general the lower temperature kilns will be preferred on account of the economy thereof except when the larger particle sizes are wanted and with the understanding that more comminuted glass forming compound will generally be needed when the mixture is heat treated or "fired" in the cooler kilns if maximum extraction of the silica is an object.

As the result of this step in the process, namely firing to at least cone 15 conditions in admixture with glass forming compound as defined, the zircon is decomposed to zirconia and silica. The commercial advantages of firing at temperatures lower than 1800° C. are obvious. Furthermore actual fusion of the zircon ore and alkali entails the additional expense of crushing the pig or ingot produced thereby, and I wish to avoid such expense, yet when I wish to produce zirconia of large crystal size I may actually fuse the zircon ore and alkali in an electric furnace, preferably in an arc furnace. Complete fusion occurs at about 2400° C. and in this embodiment of the invention, namely where the zircon ore and alkali are fused, the zirconia crystals are between about 25 microns and 50 microns in length.

Another feature of my invention is that the zircon-alkali mixture need not be quenched, and quenching is expensive in that it involves special apparatus for quickly removing the hot mixture to a cooler environment. However my invention is to be deemed to cover the process when quenching is involved and it is an advantage to cool the decomposed zircon as rapidly as practicable under all the circumstances since rapid cooling inhibits the recombination of the silica and zirconia. When as much as 0.04 mole $Na_2O$ or equivalent is used per mole of zircon, the cooling can be relatively slow due to the inhibiting effect of the alkali on the recombination. The yield of zirconia obtained by my process depends on the temperature, on the proportion of the alkali compound present, and on the time. Tables II and III above are illustrative of the effect of these conditions.

It should be understood that Table VI records a comparative test and is not an absolute measure of how much of the glass can be removed in the next step of the process. However, it is evident that the solubility of the glass formed sharply decreases as the amount of alkali employed is increased; in other words, that the time required for leaching is unduly lengthened while alkali and heat are wasted. My process therefore is economically very advantageous in that it operates within a range of alkali concentrations of very small magnitude, the effect of which is quite contrary to what informed opinion would have anticipated.

Thus I have found that a good yield of zirconia can be obtained using only .02 mole of the glass forming compound if the mixture is fired under cone 35 conditions. In carrying out the process with .02 mole of soda ash and firing to cone 35 conditions the yield of zirconia and hafnia was 100% and the purity of the $ZrO_2+HfO_2$ was 99%. On the other hand many manufacturers may not have kilns capable of firing at cone 35 conditions. For the production of zirconia for use in glass polishing a minor amount of silica glass is unimportant. By increasing the amount of the glass forming compound lower temperature firing conditions can be used. A very satisfactory glass polishing grain was made using .20 mole of soda ash (sodium carbonate $Na_2CO_3$) and firing in a cone 16 kiln and then separating the water glass as will be described. This material is estimated to have contained about 10% of silica in an amorphous sodium zirconium silicate.

The next step in the process is to extract as much of the glass as possible and where high firing temperatures were used with a small amount of the glass forming compound in accordance with the above disclosure nearly 100% of the glass can be removed. As a preliminary operation the fired mixture, which has sintered somewhat, is crushed to pass a 60 mesh screen or finer. This step consists in dissolving the $SiO_2$ from the decomposed mixture by heating it with an alkaline solution yielding caustic selected from the group consisting of NaOH and KOH, the alkaline solution having a concentration between 10% and 50% and which is heated to between 75° C. and 250° C. for from one hour to sixty hours. For this step in the process I prefer to use caustic soda (sodium hydroxide, NaOH).

If the temperature used in this step is above 100° C. the water in the solution will boil off, more or less. Loss of water can be stopped by using an autoclave, but for large scale operations at temperatures not too far above 100° C. a steam jacketed vessed equipped with a stirrer can be used, adding water from time to time to maintain the desired concentration. This apparatus can be operated economically.

In carrying out the above step of leaching with an aqueous caustic alkali solution, certain precautions as to timing are necessary. I have discovered that there is an unfavorable reaction that occurs simultaneously with the solution of the glass, namely one involving the zirconia (and hafnia) and the dissolved silica to produce an insoluble sodium-zirconium silicate amorphous product. By continuing the heating too long in the presence of the alkaline solution, the unfavorable reaction will gradually convert the sodium silicate solution and the zirconia to this unwanted amorphous insoluble product (which may be a complex alkali zirconium or hafnium silicate) and therefore the percentage of silica in the zirconia component of the washed and dried product will go through a minimum with time and increase again until nearly all of the silica is recombined. The rates of the two reactions are influenced differently by time, temperature and concentration and I have found that I can get practically pure zirconia (including of course any hafnia) as one component with practically all of the silica in solution as useful sodium silicate (or it might be potassium silicate) as the other component.

In order to find the optimum as well as the limiting conditions I decomposed some zircon with .04 mole of soda ash per mole zircon at cone 35. The decomposed product was crushed to pass a 60 mesh screen. From portions of this powder the $SiO_2$ was extracted with caustic soda of varying concentrations at different temperatures and for varying times. The results are given in the following table.

Table VII

| Temperature, Centigrade | Percent NaOH | Time, hours | Percentage $SiO_2$ Remaining |
|---|---|---|---|
| 100° | 20 | 16 | 1.44 |
| 100° | 35 | 2 | 12.92 |
| 100° | 35 | 5 | 1.6 |
| 100° | 35 | 8 | .22 |
| 100° | 35 | 16 | .10 |
| 150° | 10 | 4 | 7.86 |
| 150° | 10 | 17 | 7.68 |
| 150° | 20 | 6 | 5.72 |
| 150° | 20 | 15 | 5.64 |
| 150° | 30 | 5 | 2.66 |
| 150° | 30 | 15 | 2.56 |
| 150° | 35 | 3 | .14 |
| 150° | 35 | 5 | .06 |
| 150° | 40 | 5 | .08 |
| 150° | 40 | 16 | 3.04 |
| 150° | 50 | 5 | 9.60 |
| 200° | 35 | 5 | 1.96 |
| 250° | 35 | 5 | 5.14 |
| 250° | 40 | 16 | 20.02 |

It will be observed that the rate of the unfavorable reaction is much more rapidly increased by raising the temperature than is the rate of solution of the glass. It being understood that for some purposes, as hereinbefore explained, several per cent of silica can be tolerated, it appears that the temperature for this step in the process should be no higher than 250° C. It appears that, on the low side, a temperature of only 100° C.

gives excellent results indicating lower temperatures can be used; I estimate that on the low side the temperature in this step may be as low as 75° C. for the production of certain grades of zirconia. The concentration of the alkaline solution can be anywhere from 10% to 50%, it being understood that for the extraction of zirconia of very low silica content concentrations of between 35% and 40% and temperatures of from 100° C. to 150° C. should be used. The time of the reaction is temperature dependent and it appears that it should be no greater than five hours at 250° C. and no greater than sixty hours at 75° C. nor less than one hour at any temperature.

As the result of carrying out the steps described there is produced a slurry of sodium or potassium silicate with zirconia fines interspersed therethrough, the zirconia particles usually containing some hafnia. While in the preceding step of heating the decomposed zircon with alkaline solution I can use varying amounts of caustic, I prefer to use one mole of the caustic ($NaOH$ and/or $KOH$) per mole of $SiO_2$ so that in the final step I will recover waterglass with a ratio of 1 $Na_2O$ or $K_2O$ to 2 $SiO_2$, a valuable by-product that can help materially in reducing the cost of the whole operation. The waterglass solution is separated from the zirconia by filtration, decantation, centrifuging or any other well known means, and concentrated by evaporation of water. The zirconia (including hafnia) thus recovered is substantially pure as illustrated by the following typical analysis.

*Table VIII*

| | Per cent |
|---|---|
| $ZrO_2+HfO_2$ | 98.89 |
| $SiO_2$ | .16 |
| $TiO_2$ | .12 |
| $Fe_2O_3$ | .23 |
| $Al_2O_3$ | .49 |
| $Na_2O$ | .11 |
| | 100.00 |

I have also found that the use of borax $Na_2B_4O_7$ as the glass forming compound yielding $Na_2O$, in whole or in part, accelerates the grain growth to produce zirconia particles of larger size. It also effects decomposition at a somewhat lower temperature. Two per cent of borax is a significant proportion for the purpose of increasing the particle size and 100% borax can be used. But, when borax is used along with the other glass forming compound (such as soda ash) or when pure borax is used, the boron appears in the waterglass byproduct. In some cases this may be detrimental, in other cases harmless, in still other cases it may be beneficial. The process, accordingly, can be modified in this respect as well as others to obtain the products desired. Many different grades of zirconia are wanted in commerce and many different specifications of waterglass find use in industry.

EXAMPLES

With reference to the various disclosures and specific examples describing the process of my invention in the foregoing, the steps of the process have been explained separately for the purpose of clarity. It is clear that the whole process may comprise any combination and variation of the said steps consistent with the objects of my invention and the facts disclosed. It also is clear that the process or any of its steps can be carried out in any suitable equipment and that any suitable mechanical, thermal or other device, may be employed without departing from the scope of my invention.

The following additional examples further serve to illustrate the process and the results obtained.

EXAMPLE A

In order to produce zirconia with an average particle size between one and two microns, useful for glass polishing and other purposes, I added 0.10 mole of $Na_2CO_3$ per mole of zircon to the comminuted ore of particle size 325F, mixed well and fired the mixture (in air) for one half hour at 1550° C. (about cone 22) in an induction furnace. The zircon was completely decomposed, as indicated by X-ray analysis, and the zirconia had the desired one to two microns particle size. This decomposed zircon was ground to pass a 60 mesh screen and was then leached with 35% NaOH solution, using one mole of NaOH per mole of $SiO_2$, at 100° C. for 16 hours. Separation of the water glass from the zirconia was done by gravity settling and decanting as described. The zirconia produced analyzed as follows:

*Table IX*

| | Per cent |
|---|---|
| $ZrO_2+HfO_2$ | 96.50 |
| $SiO_2$ | 2.88 |
| Balance chiefly $Fe_2O_3$, $TiO_2$ and $Al_2O_3$ | .62 |
| | 100.00 |

EXAMPLE B

I mixed another quantity of zircon ore in particle size 325F with 0.2 mole of $Na_2CO_3$ per mole of zircon and fired the mixture at cone 16. The zircon was completely decomposed. In this case the higher percentage of alkali so increased the amount of zirconia in solution in the glass phase that extraction of the silica was difficult. After grinding the somewhat sintered mass to pass a sixty mesh screen, I heated it at 250° C. under pressure for 9 hours with 35% NaOH solution and then separated the water glass from the zirconia by settling and decanting. The resulting zirconia had a silica content of 10.5% making a product eminently satisfactory for glass polishing and as an opacifier in ceramic bodies. In these applications low silica content is not important.

EXAMPLE C

I mixed another quantity of zircon ore in particle size 325F with 0.02 mole of $Na_2CO_3$ per mole of zircon and fired the mixture at cone 35. I then crushed and extracted as in Example A (meaning that I crushed and ground the product and leached it with 35% NaOH solution) and as a result produced a good grade of water glass of $Na_2O \cdot 2SiO_2$ and zirconia of composition substantially as in Table VIII. The zircon had been completely decomposed.

EXAMPLE D

I fused about a thousand pounds of zircon in an electric arc furnace at a temperature of about 2400° C. I added no soda ash or other compound yielding $Na_2O$ or $K_2O$ to the zircon. The furnace was a standard Higgins type water cooled electric arc furnace of the type used for many years for fusing alumina and constructed substantially in accordance with U. S. Patent No. 775,654 to Aldus C. Higgins dated November 22, 1904. After the charge had been completely fused the electric current was turned off and the liquid fusion was allowed to solidify, the water being kept flowing until substantially all the charge had solidified, whereupon the pig or ingot thus produced was allowed to cool in the furnace shell until it was cool enough to work upon, whereupon the shell was stripped and the ingot was broken with sledge hammers and then crushed and ground to pass a 60 mesh screen. The silica was then extracted as in Example A, that is to say by leaching with 35% NaOH solution at 100° C. for 16 hours, using one mole of NaOH per mole of $SiO_2$. Separation of the water glass from the zirconia was done by gravity settling and decanting. I thus obtained a zirconia of particle size between 25 and 50 microns and the zirconia analyzed as follows:

*Table X*

| | Per cent |
|---|---|
| $ZrO_2+HfO_2$ | 98.9 |
| $Fe_2O_3$ | .2 |
| $TiO_2$ | .1 |
| $Al_2O_3$ | .5 |
| $SiO_2$ | .2 |
| | 99.9 |

EXAMPLE E

I proceeded exactly as in Example C except that I leached with an equivalent amount of KOH solution in place of the NaOH solution. The products were zirconia of composition substantially as in Table VIII and potassium silicate as a by-product.

EXAMPLE F

I mixed 0.17 mole borax with one mole zircon and fired to 1400° C.–1425° C. for twenty hours. The decomposed zircon was extracted for nine hours at 250° C. with 35% NaOH solution. The product had a crystal size between 10 and 40 microns and contained about 5% silica. It was suitable for use in the manufacture of zirconium salts, as an abrasive and for the manufacture of zirconium metal.

It will now be seen that, in accordance with my invention, the process should be varied depending upon the kind of zirconia wanted, the equipment available, and the importance of economy. For example a manufacturer having only cone 16 kilns should add a fairly large amount of soda ash to the zircon ore and the process is quite inexpensive; if he wants zirconia of somewhat larger particle size a substantial amount of borax should be added to the zircon ore and this will not raise the cost very much. But if hotter kilns are available a purer product can be obtained using a smaller amount of soda ash or borax or mixture of the two. Yet if very large particle size zirconia is wanted the cost of fusing the zircon will be bourne.

For glass polishing, particles under 2 microns are usually preferred. For conversion to soluble zirconium compounds and for use in enamels particles from 2 to 50 microns are very satisfactory. It will therefore be seen that since I can control the particle sizes within these limits and even beyond my process produces zirconia useful for different practical purposes and in fact it will produce zirconia useful for all of the purposes mentioned in the statement of the objects of the invention and in the foregoing description.

I have mentioned grinding the sintered mass produced by the first step to pass a sixty mesh screen for the second step. While it is advisable to grind fine in preparation for the second step, it will be satisfactory in many cases to grind only enough to pass a twelve mesh screen.

Soda and potash are quite compatible in the first step of my process so therefore the comminuted glass forming compound yielding alkali oxide is selected from the group consisting of $Na_2O$ and $K_2O$ and mixtures thereof. Sodium hydroxide and potassium hydroxide are likewise compatible in the leaching step of my process so therefore the alkaline solution yielding caustic is selected from the group consisting of NaOH and KOH and mixtures thereof. Obviously if a mixture of caustic soda and caustic potash is used in the leaching step the water glass will be a mixed sodium and potassium silicate. In this leaching step of the process the total amount of alkali hydroxide used can be from 0.5 mole to 2 moles thereof per mole of silica contained in the zircon ore, as within those limits the process can be successfully performed.

Also, in another aspect, my invention involves the separation of zircon into zirconia and soluble silica by heating it with comminuted glass forming compound yielding alkali oxide selected from the group consisting of $Na_2O$ and $K_2O$ and mixtures thereof, the compound being in amount from .02 to .50 mole for each mole of combined silica in the zircon, regardless of how the zirconia and silica are mechanically separated or whether they ever are.

It will thus be seen that there has been provided by this invention a process in which the various objects hereinbefore set forth, together with many thoroughly practical advantages, are successfully achieved. As various possible embodiments might be made of the mechanical features of the above invention and as the art herein described might be varied in various parts, all without departing from the scope of the invention, it is to be understood that all matter hereinabove set forth is to be interpreted as illustrative and not in a limiting sense.

I claim:

1. Process for the production of zirconia from zircon ore comprising the successive steps of preparing a mixture of finely comminuted zircon ore with a comminuted compound yielding alkali oxide which with silica forms a glass, said alkali oxide being selected from the group consisting of $Na_2O$ and $K_2O$ and mixtures thereof and the said comminuted compound being admixed in an amount between .02 mole and .50 mole for each mole of combined silica contained in the zircon ore; heating the said mixture to at least cone 15 conditions; and extracting alkali silicate from the resultant product and recovering the zirconia therefrom by leaching the said resultant product with an aqueous solution of an alkali hydroxide selected from the group consisting of NaOH and KOH and mixtures thereof, the concentration of the said alkali hydroxide in aqueous solution being between 10 and 50% by weight, and the said leaching step being carried out at a temperature between 75° and 250° C. for from 1 to 60 hours.

2. Process according to claim 1 in which the alkali oxide is $Na_2O$.

3. Process according to claim 2 in which the caustic is NaOH.

4. Process according to claim 3 in which the comminuted compound mainly consists of sodium carbonate.

5. Process according to claim 4 in which the comminuted compound includes at least 2% borax.

6. Process according to claim 1 in which the caustic is NaOH.

7. Process according to claim 6 in which the comminuted compound mainly consists of sodium carbonate.

8. Process according to claim 7 in which the comminuted compound includes at least 2% borax.

9. Process according to claim 1 in which the comminuted compound mainly consists of sodium carbonate.

10. Process according to claim 9 in which the comminuted compound includes at least 2% borax.

11. Process according to claim 1 in which the comminuted compound includes at least 2% borax.

12. Process according to claim 1 in which the alkali oxide is $Na_2O$ and the comminuted compound mainly consists of sodium carbonate.

13. Process according to claim 12 in which the comminuted compound includes at least 2% borax.

14. Process according to claim 1 in which the alkali oxide is $Na_2O$ and the comminuted compound includes at least 2% borax.

15. Process according to claim 1 in which the caustic is NaOH and the comminuted compound includes at least 2% borax.

16. Process according to claim 15 in which the alkali oxide is $Na_2O$.

References Cited in the file of this patent

UNITED STATES PATENTS

| Number | Name | Date |
|---|---|---|
| 1,601,232 | Blumenberg | Sept. 21, 1926 |
| 1,658,807 | Kinzie | Feb. 14, 1928 |
| 1,789,311 | Kinzie | Jan. 29, 1931 |
| 2,047,614 | Cavezzale | July 14, 1936 |
| 2,076,080 | George | Apr. 6, 1937 |
| 2,204,582 | Donahue | June 18, 1940 |
| 2,206,287 | Kenzie | July 2, 1940 |
| 2,239,880 | Curll | Apr. 29, 1941 |
| 2,297,628 | McGregor | Sept. 29, 1942 |
| 2,315,519 | Hake | Apr. 6, 1943 |
| 2,352,530 | Fulcher | June 27, 1944 |
| 2,438,552 | Field | Mar. 30, 1948 |
| 2,535,526 | Ballard | Dec. 26, 1950 |

FOREIGN PATENTS

| Number | Country | Date |
|---|---|---|
| 350,728 | Great Britain | June 8, 1931 |

OTHER REFERENCES

Chemical Engineering, Feb. 1951, pages 199–200, "Fused Stabilized Zirconia," McGraw-Hill Publishing Co., N. Y.